US008069199B2

(12) United States Patent
Cornea-Hasegan

(10) Patent No.: US 8,069,199 B2
(45) Date of Patent: Nov. 29, 2011

(54) METHODS AND ARRANGEMENTS TO CORRECT FOR DOUBLE ROUNDING ERRORS WHEN ROUNDING FLOATING POINT NUMBERS TO NEAREST EVEN

(75) Inventor: Marius Cornea-Hasegan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1004 days.

(21) Appl. No.: 12/006,145

(22) Filed: Dec. 31, 2007

(65) Prior Publication Data

US 2009/0172065 A1    Jul. 2, 2009

(51) Int. Cl.
*G06F 7/38* (2006.01)
*G06F 7/00* (2006.01)
*G06F 15/00* (2006.01)

(52) U.S. Cl. ......... 708/497; 708/496; 708/525; 708/551

(58) Field of Classification Search .......... 708/495–497, 708/525–530, 550–551
See application file for complete search history.

(56) References Cited

U.S. PATENT DOCUMENTS 6,512,523 B1 * 1/2003 Gross .......................... 345/606

OTHER PUBLICATIONS

C. Lee, "Multistep Gradual Rounding," IEEE Trans. Computers, vol. 32, No. 4, pp. 595-600, Apr. 1989.*

Lutz, D.R.; Burgess, N.; "Overcoming double-rounding errors under IEEE 754-2008 using software," 2010 Conference Record of the Forty Fourth Asilomar Conference on Signals, Systems and Computers (ASILOMAR), pp. 1399-1401, Nov. 2010.*

S. Boldo and G. Melquiond, "When Double Rounding Is Odd," Proc. 17th IMACS World Congress Computational and Applied Math., 2005.*

Sylvie Boldo, Guillaume Melquiond, "Emulation of a FMA and Correctly Rounded Sums: Proved Algorithms Using Rounding to Odd," IEEE Transactions on Computers, pp. 462-471, Apr. 2008.*

S.A. Figueroa, "When Is Double Rounding Innocuous," SIGNUM Newsletter, vol. 30, No. 3, pp. 21-26, 1995.*

* cited by examiner

*Primary Examiner* — Lewis Bullock, Jr.
*Assistant Examiner* — Matthew Sandifer
(74) *Attorney, Agent, or Firm* — Schubert Law Group PLLC

(57) ABSTRACT

Methods and arrangements to correct for double rounding errors when rounding floating point numbers to nearest even are described. Embodiments include transformations, code, state machines or other logic to perform a floating point operation on one or more floating point numbers of precision P1 in base b, producing positive result res0 of precision greater than precision P1; rounding positive result res0 to precision P1 to the nearest even, producing positive result res1; and rounding the result res1 to precision P2 to the nearest even, where P2 is narrower than P1, producing result res2. The embodiments may also include correcting res2 for double rounding errors. The correcting may include determining that res1 is midway between two consecutive floating point numbers of precision P1, the larger (smaller) being res2, determining that rounding res0 to produce res1 involved rounding up (down), and decrementing (incrementing) the significand of res2 to obtain the corrected result res2'.

17 Claims, 4 Drawing Sheets

METHODS AND ARRANGEMENTS TO CORRECT FOR DOUBLE ROUNDING ERRORS WHEN ROUNDING FLOATING POINT NUMBERS TO NEAREST EVEN

FIELD

The present invention is in the field of performing arithmetic on computing devices. More particularly, embodiments are in the field of correcting double rounding errors when rounding to nearest even.

BACKGROUND

The DRAFT Standard for Floating-Point Arithmetic IEEE P754 (Oct. 5, 2007) mandates standards for performing floating point operations on a set of numbers to produce a result in one precision and rounding the results down to another precision. Existing floating point implementations may produce an incorrect result, a double rounding error, if they perform the combined operation in two steps—the first operation followed by the rounding. Implementing the combined operation by starting anew may prove burdensome.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Generally speaking, methods and arrangements to correct for double rounding errors when rounding floating point numbers to nearest even are contemplated. Embodiments include transformations, code, state machines or other logic to perform a floating point operation on one or more floating point numbers of precision P1 in base b, thereby producing positive result res0 of precision greater than P1. The embodiments may also include rounding positive result res0 to precision P1 to the nearest even, thereby producing positive result res1. The embodiments may also include rounding the result res1 to precision P2 to the nearest even, where P2 is narrower than P1, thereby producing result res2, a floating point number whose significant, viewed as an integer, is an even number. The embodiments may also include correcting res2 for double rounding errors. The correcting may include determining that res1 is midway between two consecutive floating point numbers of precision P2, the larger being res2, determining that rounding res0 to produce res1 involved rounding up, and decrementing the significand of res2 to obtain the corrected result res2'.

Figure 1:
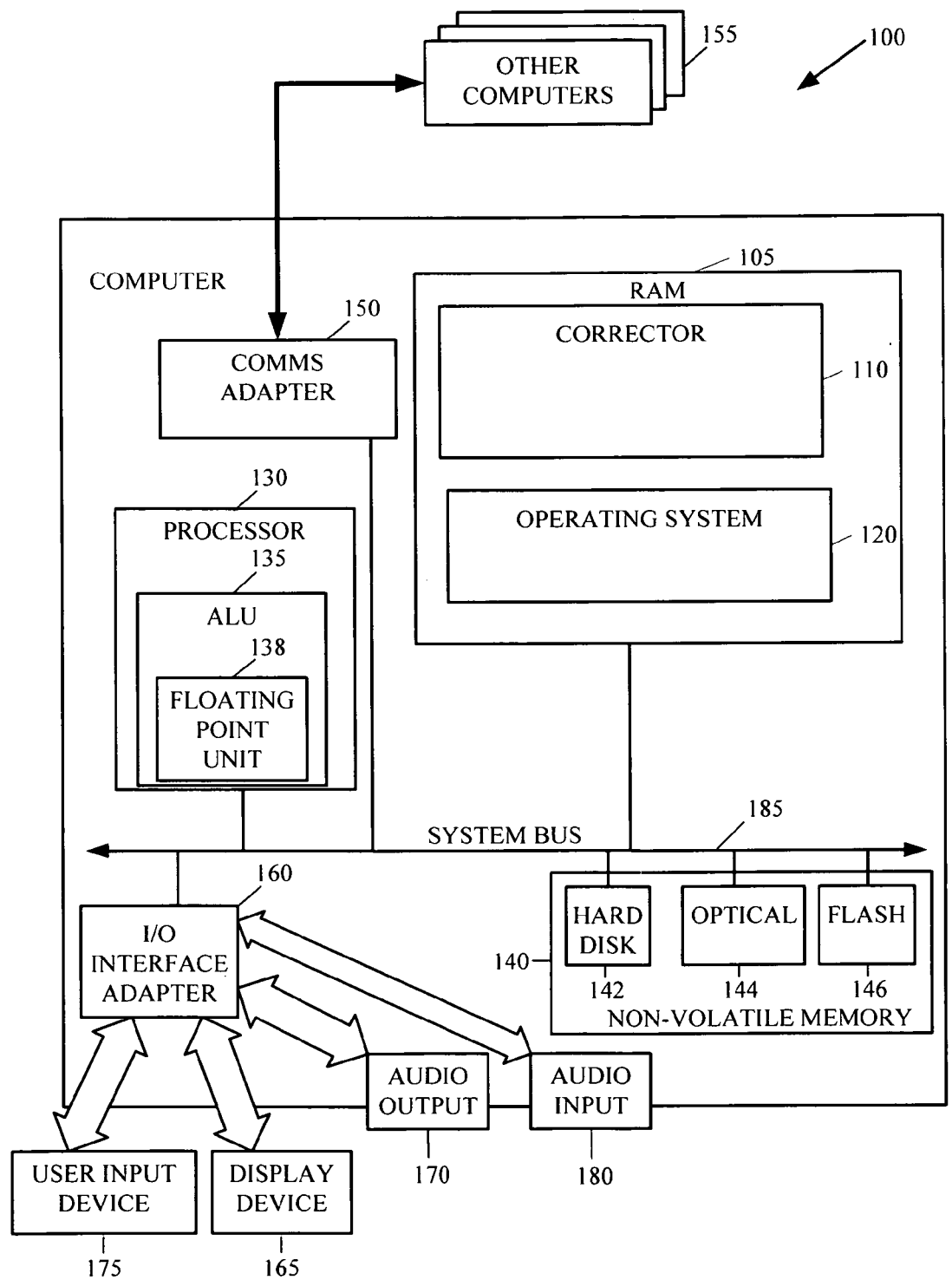
FIG. 1 is a diagram of an embodiment of a computer capable of correcting double rounding errors in floating point computations, where the rounding is to nearest-even.

Turning to FIG. 1, depicted is an embodiment of a computer 100 capable of correcting double rounding errors in floating point computations, where the rounding is to the nearest even. The floating point representation of a number may consist of a sign, a significand, and an exponent. The value of the number may equal:

$$(-1)^S \times \text{significand} \times \text{base}^{exponent}$$

For example, the base-10 number 1.325 may be rewritten or represented as $(-1)^0 \times 1325 \times 10^{-3}$. In this example, the sign, 0, indicates the number is positive. The significand is 1325 and the exponent is -3. The number is significant to four digits. On a computer, the most common base is base 2 (binary). Base 10 (decimal) is often used, base 16 is occasionally used, and other bases may be used. The size of a floating point representation of a number on a computer usually is a multiple of a word. A 32-bit floating point may be of the form:

TABLE 1

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| s | exponent | | | | | | | | significand | | | | | | | | | | | | | | | | | | | | | | |

In the above table, the sign s occupies 1 bit, the exponent occupies 8 bits, and the significand occupies 23 bits. The number stored in the exponent field may not be the actual exponent. Instead, the actual exponent may be sum of the number stored in the representation of the number plus another summand, the bias. For example, if the stored exponent is 2 and the bias is +5, the actual exponent is +7. A floating point number whose representation uses 32 bits may be called single precision. Double precision floating point numbers may use 64 bits, 1 bit for the sign, 11 for the exponent, and 52 for the significand. IEEE standard 754 prescribes standards for floating point numbers. The IEEE 754 standard specifies four formats for floating point numbers, namely: single, single extended, double and double extended.

The formats may vary in the size of the significand. The more digits available for the significand, the more precision available for the representation of a number. For example, the (decimal) number 12.34 may be represented exactly with four decimal digits (length of significand=4). If 3 digits are used, the number must be represented as 12.3 or 12.4. If 2 digits are used, the number must be represented as 12 or 13. For simplicity, in this and following examples, base 10 will be used, and the number of digits of the significand will be much smaller than in a standard computer representation. These examples are for illustration and not limitation.

In the course of performing floating point arithmetic, it may be necessary to convert a floating point number to a number with fewer digits in the significand. Performing an arithmetic operation may produce a number with more digits in the significand than are available. For example, exactly adding the two two-digit numbers 10 and 0.02 produces the four digit number 10.02. In a two-digit representation, the result would have to be converted to 10 or 11. In addition, a floating point number may be converted to a number of lesser significance. For example, a series of multiplications may be performed in double-precision. The result may be converted to single precision. This process of converting a floating point number to a floating point number with fewer digits is called rounding.

There are a variety of methods for rounding. In rounding to precision P in nearest-away mode, a floating point number of greater precision is rounded to the nearest neighboring floating-point number of precision P, with ties (midpoints between two consecutive floating-point numbers of precision P) rounded to the floating-point number of larger magnitude of the two nearest floating-point numbers surrounding it (the number which is 'farther away from zero'). For example, in converting a three-digit number to a two-digit number, 10.5 is rounded up to the number 11, and −11.5 is rounded down to −12. In "nearest even," a floating point number is converted to the nearest even floating point number of the desired number of digits. In case of a tie, the floating point number is rounded up if the next-higher number is even and rounded down otherwise. In a binary representation, even means the least significant bit is zero. For example, in converting a three-digit number to a two-digit number, 10.5 is rounded down to the even number 10, and 11.5 is rounded up to the even number 12. In rounding toward +infinity, a floating point number is rounded to the higher of the two numbers it is between, regardless of value. For example, in converting three-digit numbers to two-digit numbers, 1.23 is rounded to 1.3 and −2.86 is rounded to −2.8. In rounding toward −infinity, a floating point number is rounded towards −infinity, regardless of value. For example, 1.23 is rounded to 1.2 and −2.86 is rounded to −2.9.

Double rounding errors in rounding to nearest-even mode may occur typically when the result res0 of a floating-point operation with operands of precision P1 has more significant digits than permitted by precision P1. The result is rounded correctly (in the IEEE 754R sense) first to a result res1 of precision P1, and then res1 is rounded again to a narrower precision P2. Sometimes, the result res2 does not represent the IEEE-correct result res2' that would be obtained were the original result res0 rounded directly to precision P2. In such cases res2 differs from res2' by one unit-in-the-last-place (ulp), and an error which occurs in such a situation is called a double rounding error. Only positive results will be considered here, as treatment of negative results is similar because rounding to nearest-even is symmetric with respect to zero. A double rounding error for rounding to nearest-even can be upward (when the result res is too large by 1 ulp) or downward. For example, in going from 3 digits to 2:

11.0+0.490=11.49→11.5 (the arrow will designate rounding).

If 11.5 is now rounded to two digits, the result is 12, since 11.5 is exactly halfway between 11 and 12, and 12 is even. Rounding 11.49 to 2 digits directly produces 11. Thus, the double rounding produced a result, 12, which is one higher than directly rounding to the desired precision.

Similarly, a double rounding error for rounding to nearest-even can be downward. For example, in going from 3 digits to 2:

10.0+0.510=10.51→10.5.

If 10.5 is now rounded to two digits, the result is 10, since 10.5 is exactly halfway between 10 and 11, and 10 is even. Rounding 10.51 to 2 digits directly produces 11. Thus, the double rounding produced a result, 10, which is one lower than directly rounding to the desired precision.

Correcting certain double rounding errors is mandated by a proposed IEEE draft. Provided decimal floating-point arithmetic is supported, the revision of the IEEE Standard 754-1985 for Floating-Point Arithmetic mandates that the floating-point operations for addition, subtraction, multiplication, division, square root, and fused multiply-add (a unitary operation to calculate a×b+c) have to be capable of rounding results correctly to any supported floating-point format, for operands in any (and possibly different) supported floating-point format. The draft of the revised standard IEEE 754, published in October 2007, is nearing approval and is expected to become the new standard for floating-point arithmetic in the beginning of 2008. Once IEEE 754R becomes the new IEEE floating-point standard, operations with mixed-format operands and results will be required to generate correctly rounded results. This will be a requirement for both binary and decimal floating-point operations, and for all rounding modes, including the rounding to nearest-even mode.

Computer 100 of FIG. 1 includes random access memory (RAM) 105, a processor 130 or CPU, non-volatile memory 140, a communications adapter 150, and an Input/Output (I/O) interface adapter 160 connected by system bus 185. Stored in RAM 105 is corrector 110 and operating system 120. Corrector 110 may comprise computer program instructions for correcting double rounding errors. The computer program instructions may be stored in a library. In some embodiments, the routines composed of the instructions may be called directly from an application. In other embodiments, the routines may be inserted by a compiler.

Operating system 120 may comprise UNIX™, Linux™, Microsoft Windows™, AIX™, IBM's i5/OS™, or other operating systems useful for correcting for double rounding errors when rounding floating point numbers to nearest even as will occur to those of skill in the art. Corrector 110 and operating system 120 (components of software) are shown in RAM 105 in FIG. 1, but many components of such software may be stored in non-volatile memory 140 also. Further, while the components of such are shown simultaneously present in RAM, in some other embodiments, only some of the components of RAM 105 may be present at any given time.

Processor 130 may execute the instructions of code running on computer 100. Processor 130 contains arithmetic logic unit (ALU) 135. ALU 135 may perform arithmetic operations such as addition and multiplication and logical operations such as AND and OR. ALU 135 contains floating point unit 138. Floating point unit 138 may perform arithmetic operations involving numbers in floating point representation. The operations may include standard two-argument operations such as addition, subtraction, multiplication, and division; may include one-argument operations such as taking the square root; and may include the three-argument operation fused multiply-add. The operations may include rounding. In some embodiments, corrector 110 may improve the functioning of floating point unit 138 by correcting for double-rounding errors and helping to put floating point unit 138 in compliance with the requirements of the proposed standard IEEE 754.

Non-volatile computer memory 140 constitutes memory that may retain its contents when the power of computer 100 is turned off. Non-volatile memory may be implemented as a hard disk drive 142, optical disk drive 144, electrically erasable programmable read-only memory space (EEPROM or Flash memory) 146, RAM drives (not shown), or as any other kind of computer memory as will occur to those of skill in the art.

Communications adapter 155 may implement the hardware level of data communications between computer 100 and other computers, such as other computers 155. The data communications may occur directly or through a network. I/O interface adapter 160 implements user-oriented I/O through, for example, software drivers and computer hardware for controlling output to display devices such as display device 165 and audio output device 170 as well as user input from user input device 175 and audio input device 180. User input device 175 may include both a keyboard and a mouse. Audio output 170 may include speakers or headphones and audio input device 180 may include a microphone or other device to capture sound.

The computer and components illustrated in FIG. 1 are for explanation, not for limitation. In some embodiments, embedded systems, PDAs, cell phones, BlackBerries® and other computing devices may correct for double rounding errors when rounding floating point numbers to nearest even. In many embodiments, modules to correct for double rounding errors when rounding floating point numbers to nearest even may be implemented in hardware, firmware, or in state machines or may form a component of an operating system.

Figure 2:
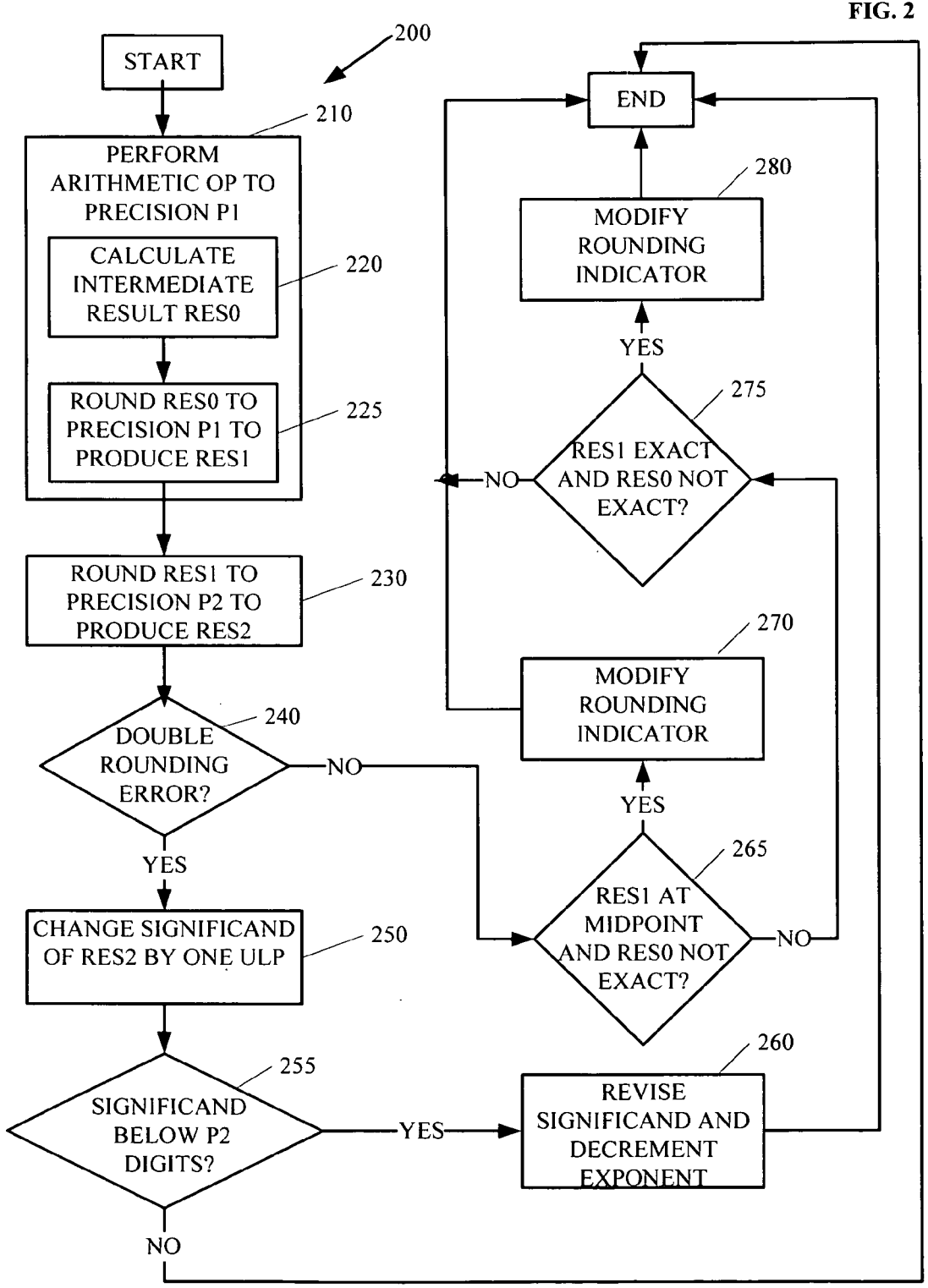
FIG. 2 is a flowchart of an embodiment of a method to correct double-rounding errors in floating point arithmetic, where the rounding is to nearest-even.

Turning to FIG. 2, depicted is a flowchart 200 of an embodiment of a method to correct double-rounding errors in floating point arithmetic, where the rounding is to nearest-even. The method of flowchart 2 includes performing an arithmetic operation to precision P1 (element 210). The operation may be a unary, binary, or ternary operation. For example, two numbers may be multiplied or added in double precision. The operation may be performed in two stages. The first stage (element 220) may produce an intermediate result, res0, which may be of greater precision than the desired precision. For example, 9.01+0.003→9.013. The intermediate result, 9.013 has four significant digits. In the second stage, the intermediate result res0 is rounded to res1, a number with the desired precision (element 225). For example, in a calculation to three significant figures, 9.013 may be rounded to 9.01. The result res1 is then rounded to a number of less precision, res2 (element 230). For example, 9.01 may be rounded to the two-digit number 9.0.

The method includes testing whether a double rounding error has occurred (element 240). This test and the correction of double rounding errors in element 250 is based on the observation that such errors may occur when:

the first rounding pulls up the result to a value that is a midpoint between two consecutive floating-point numbers of the specified precision P2 (as seen on the real axis), the higher of the two consecutive floating point numbers is even, and therefore the second rounding causes an error of 1 ulp upward (double rounding error upward); or the first rounding pulls down the result to a value that is a midpoint situated to the right of an even floating-point number (on the real axis) for the second rounding (double rounding error downward).

Four logical rounding indicators for each of the two rounding operations (greater than P1 to P1 and then P1 to P2) can be used for correcting the result when a double rounding occurs (C notation will be used for logical operators, as well as for bitwise logical operators). The four indicators are: is_inexact_lt_midpoint, is_inexact_gt_midpoint, is_midpoint_lt_even, and is_midpoint_gt_even. is_inexact_lt_midpoint indicates that a number to be rounded is nearer to the lesser of the two numbers it lies between; is_inexact_gt_midpoint indicates that the number is nearer to the greater of the two numbers; is_midpoint_lt_even indicates that the number is midway between the two numbers and the greater of the two numbers has a significand whose last digit is an even number; and is_midpoint_gt_even indicates that the number is midway between the two numbers and the lesser of the two numbers has a significand whose last digit is an even number. Such a number will be loosely referred to as an even number. A fifth indicator can be derived from the first three:

is_exact = !is_inexact_lt_midpoint && !is_inexact_gt_midpoint && !is_midpoint_lt_even && !is_midpoint_gt_even is_exact indicates that the number exactly equals a number of lower precision; i.e., that its low-order digits are zeroes. For example, suppose a three-digit number is to be rounded to a two-digit number. Then, 9.02 is is_inexact_lt_midpoint. It is closer to 9.0 than to 9.1.

9.05 is is_midpoint gt_even. It is midway between 9.0 and 9.1, and greater than 9.0, the even number of the pair.

9.15 is is_midpoint_lt_even. It is midway between 9.1 and 9.2, and less than 9.2, the even number of the pair.

9.08 is is_inexact_gt_midpoint. It is closer to 9.1 than to 9.0.

9.00 and 9.10 are is_exact. The first rounds exactly to 9.0 and the second rounds exactly to 9.1.

In pseudo-code (or C), the test for a double-rounding error can be expressed as follows ('0' identifies the first rounding and '1' identifies the second rounding):

```
(is_midpoint_lt_even1 && (is_inexact_gt_midpoint0 ||
  is_midpoint_lt_even0))
    // double rounding error upward {expression 1}
|| //second possibility for double rounding error
(is_midpoint_gt_even1
  &&(is_inexact_lt_midpoint0||is_midpoint_gt_even0))
    // double rounding error downward {expression 2}
```

The C expression means that a double rounding error has occurred if either of the two expressions in parentheses, labeled expression 1 and expression 2, is true. The first expression tests for a double-rounding error upwards. This occurs if the second rounding involved a number halfway between the two nearest lower-precision numbers, with an even number on the right (higher); and the first rounding produced a greater number. In C, && means AND and || means OR. Consider the earlier example, 11.0+0.490=11.49→11.5→12

The number involved in the second rounding, 11.5, is midway between 11 and 12, and is less than the even number of the pair it lies between. Therefore, is_midpoint_lt_even1 is true. In addition, the number involved in the first rounding, 11.49, satisfies is_inexact_gt_midpoint0. The number is past the midpoint between 11.4 and 11.5, and is not exactly equal to 11.5. Since one part of the OR clause is true, the clause as a whole is true.

Similarly, the second expression tests for a double-rounding error downwards. This occurs if the second rounding involved a number halfway between the two nearest lower-precision numbers, with an even number on the left (lower);

and the first rounding produced a lower number. The second expression is true for the second example:

$$10.0+510=10.51 \rightarrow 10.5 \rightarrow 10.$$

The number involved in the second rounding, 10.5, is halfway between 10 and 11, and is greater than the even number of the pair it lies between. In addition, the first rounding reduced the number involved, from 10.51 to 10.5.

If the test of element 240 if satisfied, the method also includes correcting the double rounding error. In flowchart 200, the correction includes changing the significand of res2 by one ULP (unit-in-the-last-place) (element 250). In the first kind of double-rounding error, the result res2 is one unit greater than the correct result. The double-rounding error may be corrected by decrementing (reducing by one in the least significant part), the significand of res2 (element 250). In the example, res2 is 12. Decrementing it produces 11. This is the result of performing the original addition and rounding directly to two digits. The result of the addition, 11.49, is closer to 11 than to 11.49. Similarly, if the double-rounding error was caused by rounding down twice, the error may be corrected by adding 1 to the significand. In the second example, adding one to the result produces 11, the result of performing the original addition and rounding immediately to two digits.

In rare cases, the above correction may produce the wrong result. Elements 255 and 260 test and correct for these cases. In C, the test of element 255 and correction of element 260 may be expressed as:

```
{if (significand == b^(P2-1)-1) {// falls below the smallest P2-digit significand
significand = b^P2-1;
unbiased_exp--; // decrease exponent by 1
}
```

In the above code, P2 refers to the number of digits, and b to the base, 10 in all of the examples. If after decrementing the significand of res2, it falls below the smallest P2-digit number (element 255), the significand is replaced by the highest P2-digit number and the exponent of res2 is reduced by one (element 260). Consider a slight variation of the above example:

$$9.90+0.0490=9.949(res0) \rightarrow 9.95(res1) \rightarrow 10(res2)$$

In this example, the correction provided by element 250 provides an incorrect result. It calls for decrementing 10 by 1, to produce 9. The correct result, though, is 9.9. In this example, following the above code detects and corrects the error. Here, P2=2, and the exponent is 0. Decrementing the significand of res2 by 1 produces 9, a one-digit number. The test of element 255, however, is satisfied.

$$9=10^{2-1}-1=10-1$$

Therefore, the correction of element 260 is made. The significand of res2 is set equal to $99=10^2-1$. In addition, the exponent is decremented to −1. The number represented is $99 \times 10^{-1}$, or 9.9, the correct result.

An upward correction in element 250 does not cause a similar problem. For example, suppose the result of double rounding to two digits is 99, and the result is to be corrected by adding 1. The result, 100, is correct. Although it is not a two-digit result, it can be converted to a two-digit result by increasing the exponent. This process is called renormalizing. In other words, $100 \times 10^0 = 10 \times 10^1$. If the test of element 255 fails, the method of flowchart 200 may end.

The execution of elements 265, 270, 275, and 280 may provide correct indicators for the two-step rounding process used to calculate res2. In effect, they provide the indicators that would result from directly rounding from res0 to res2. The correct indicators may be useful in case further rounding is needed, such as to represent res2 in a normalized form. For example, suppose a calculation produces $231 \times 10^{-5}$, but the largest negative exponent permitted in the floating point representation is −3. Then res2 must be rewritten as a one digit $number \times 10^{-3}$. The rewriting requires rounding 2.3 to a one digit number. These elements of flowchart 200 are carried out only when the test in element 240 fails; that is, does not disclose a double rounding error. In some embodiments, however, the rounding indicators may also be corrected when a double rounding error has been corrected.

Element 265 tests whether the is_midpoint1 label is correct. If res1 is at a midpoint, but res0 was rounded to produce res1, then res0 was not at a midpoint, and a different rounding indicator is applied to the two-step rounding process. For example, suppose $$11.54 \rightarrow 11.5 \rightarrow 12.$$

Then, the overall rounding process from 11.54 to 12 is best described by is_inexact_gt_midpoint. The initial number, 11.54 is greater than the midpoint 11.5 of the two closest two-digit numbers, namely 11 and 12. If the test of element 265 is true, an appropriate rounding indicator is set to TRUE (element 270) and the method of flowchart 200 ends. In some embodiments, a similar correction to the rounding indicators may be made in the case of a double rounding error. In that case, the overall rounding process is best described by is_inexact_lt_midpoint or is_inexact_gt_midpoint, depending upon whether the double rounding error was upward or downward, respectively, and the appropriate rounding indicator is set to TRUE. In pseudo-code or C:

```
if double_error_upwards {
    is_midpoint_lt_even1 = 0;    // set this indicator FALSE
    is_inexact_lt_midpoint1 = 1;  // set this indicator TRUE
else if double_error-downwards {
    is_midpoint_gt_even1 = 0;    // set this indicator FALSE
    is_inexact_gt_midpoint1 = 1; // set this indicator TRUE
}
```

Otherwise, the method of FIG. 2 includes checking whether the rounding from res1 to res2 is exact but the rounding from res0 to res1 is not (element 275). The rounding from res1 to res2 is exact if the two numbers have the same value. For example, suppose $11.02 \rightarrow 11.0 \rightarrow 11$. While the second rounding, from 11.0 to 11, is exact, the overall rounding is not. If the test of element 275 is satisfied, the rounding indicator for res2 is modified (element 280). In the above example, the appropriate indicator is is_inexact_lt_midpoint. 11.02 is less than halfway between 11 and 12, the closest two-digit numbers. If the test of element 275 fails, the method of flowchart 200 ends.

Elements 265 through 280 may be expressed in pseudo-code as follows:

```
if (!is_midpoint_lt_even1 && !is_midpoint_gt_even1 && // clause 1
    !is_inexact_lt_midpoint1 && !is_inexact_gt_midpoint1) {
    // if this second rounding was exact the result may still be
    // inexact because of the previous rounding
```

-continued

```
    if (is_inexact_gt_midpoint0 || is_midpoint_lt_even0) // action 1
        is_inexact_gt_midpoint1 = 1;
    if (is_inexact_lt_midpoint0 || is_midpoint_gt_even0) // action 2
        is_inexact_lt_midpoint1 = 1;
} else if (is_midpoint_gt_even1 &&           // clause 2
        (is_inexact_gt_midpoint0||is_midpoint_lt_even0)) {
    // pulled up to a midpoint greater than an even floating-point number
    is_midpoint_gt_even1 = 0;
    is_inexact_lt_midpoint1 = 1;
} else if (is_midpoint_lt_even1 &&    // clause 3
        (is_inexact_lt_midpoint0 || is_midpoint_gt_even0)) {
    // pulled down to a midpoint less than an even floating-point number
    is_midpoint_lt_even1 = 0;
    is_inexact_gt_midpoint1 = 1;
}
```

Clause1 performs the test of element 275. The first two lines check if the second rounding was exact. A rounding of a number is exact if none of the other rounding indicators apply—the number was not (indicated by the "!" symbol) at a midpoint, greater than or less than an even number; was not inexact but more than halfway, and was not inexact but less than halfway. If the second rounding was exact, the test of clause 1 checks the first rounding. If the first rounding was a rounding up (res0 was greater than a midpoint or at a midpoint and less than an even number), then the overall effect of the two roundings is that the initial number, res0, was above a midpoint. The proper rounding indicator, is_inexact gt_midpoint1 is set to TRUE (in pseudo-code, a non-zero value indicates TRUE and a zero-value indicates FALSE). For example,

| res0 | | res1 | | res2 |
|---|---|---|---|---|
| 11.95 | → | 12.0 | → | 12 |

Here, the rounding from res1 to res2 is exact. res0 is at a midpoint of 11.95 is midway between 11.9 and 12.0 and less than an even number. The overall rounding from res0 to res2 goes from a number greater than the midpoint of 11 and 12 to 12. Similarly, if the first rounding was down, the overall effect of the two roundings is that the initial number, res0, was below a midpoint, and the proper rounding indicator, is_inexact_lt_midpoint1, is set to TRUE.

Clauses 2 and 3 perform the test of element 265, that res1 was at a midpoint, but res0 was not exactly equal to its rounded value res1. There are two separate cases. Clause 2 tests whether res1 is at a midpoint greater than the even number of a pair (so that the rounding to res2 is down), and the rounding from res0 to res1 was up (res0 was either greater than the midpoint or at a midpoint and less than an even number). If this test is satisfied, the is_inexact_lt_midpoint1 is set to TRUE to indicate that the overall rounding was from a number less than a midpoint to a lower number. In addition, the is_midpoint_gt_even1 is set to FALSE.

Clause 3 tests for the symmetric case—whether res1 is at a midpoint less than the even number of a pair (so that the rounding to res2 is up), and the rounding from res0 to res1 was down (res0 was either less than the midpoint or at a midpoint and greater than an even number). If this test is satisfied, is_inexact gt_midpoint1 is set to TRUE to indicate that the overall rounding was from a number greater than a midpoint to a higher number; and the is_midpoint_lt_even is set to FALSE.

There are several methods for determining the values of the rounding indicators used to carry out the method of flowchart 200. One method involves obtaining the values of the least significant digit, the rounding digit and sticky bit, three variables derived from the exact result. The least significant digit is the right-most digit of the significand. For an n-digit number, it is the nth digit. For example, the least significant digit of $123.4 \times 10^{-5}$ to precision 3 places is 3. The rounding digit is the digit next to, and of lower weight than the least-significant digit that fits in the significand of the specified precision before rounding) and the sticky bit s is the logical OR of all the remaining lower bits). In other words, the sticky bit s is 1 if any of the digits to the right of the rounding digit is non-zero, and is 0 if all of these digits are 0.

For binary floating-point operations using rounding to nearest-even, the rounding digit is a bit. The four rounding indicators can be derived from l, r and s as follows (~x represents the bitwise complement of x and '&' stands for bitwise logical AND):

```
is_inexact_lt_midpoint = ~r & s
is_inexact_gt_midpoint = r & s
is_midpoint_lt_even = l & r & ~s
is_midpoint_gt_even = ~l & r & ~s
is_exact = ~r & ~s
```

In binary, the rounding bit is either 0 or 1. 1 is halfway, since 1 is halfway between 0 and 2. The first line sets the is_inexact_lt_midpoint to TRUE if and only if the rounding bit is 0, but there are non-zero less-significant bits. Otherwise, the indicator is set to FALSE. For example, in rounding 10001 to two bits, the indicator is TRUE. The rounding bit, the third bit, is zero, and a bit to the right (the last) is non-zero. Similarly, the second line provides that in rounding 101100 to two bits, the is_inexact_gt_midpoint is set to TRUE. The third bit, the rounding bit, is 1 (TRUE) and there are less significant bits. The third line sets the is_midpoint_lt_even indicator TRUE if and only if the rounding bit is 1, all subsequent bits are 0, and the lower number of the pair is odd (has last digit 1). The fourth line sets the is_midpoint_gt_even indicator TRUE if and only if the rounding bit is 1, all subsequent bits are 0, and the lower number of the pair is even (has last digit 1). The last line above sets the is_exact to TRUE if and only if the rounding bit and all bits to the right are 0.

For decimal floating-point operations, r constitutes a digit rather than a bit. In this case:

```
is_inexact_lt_midpoint = ((r == 0 && s!= 0) || ( <= r && r <= 4))
is_inexact_gt_midpoint = ((r == 5 && s != 0) || (r > 5))
is_midpoint_lt_even = (((1 % 2) == ) && (r==5) && (s==0))
is_midpoint_gt_even = (((1 % 2) == 0) && (r==5) && (s==0))
is_exact = ((r==0) && (s==0))
```

This code is similar to the other code, except that values from 0 to 9 for the digits must be considered.

Figure 4:
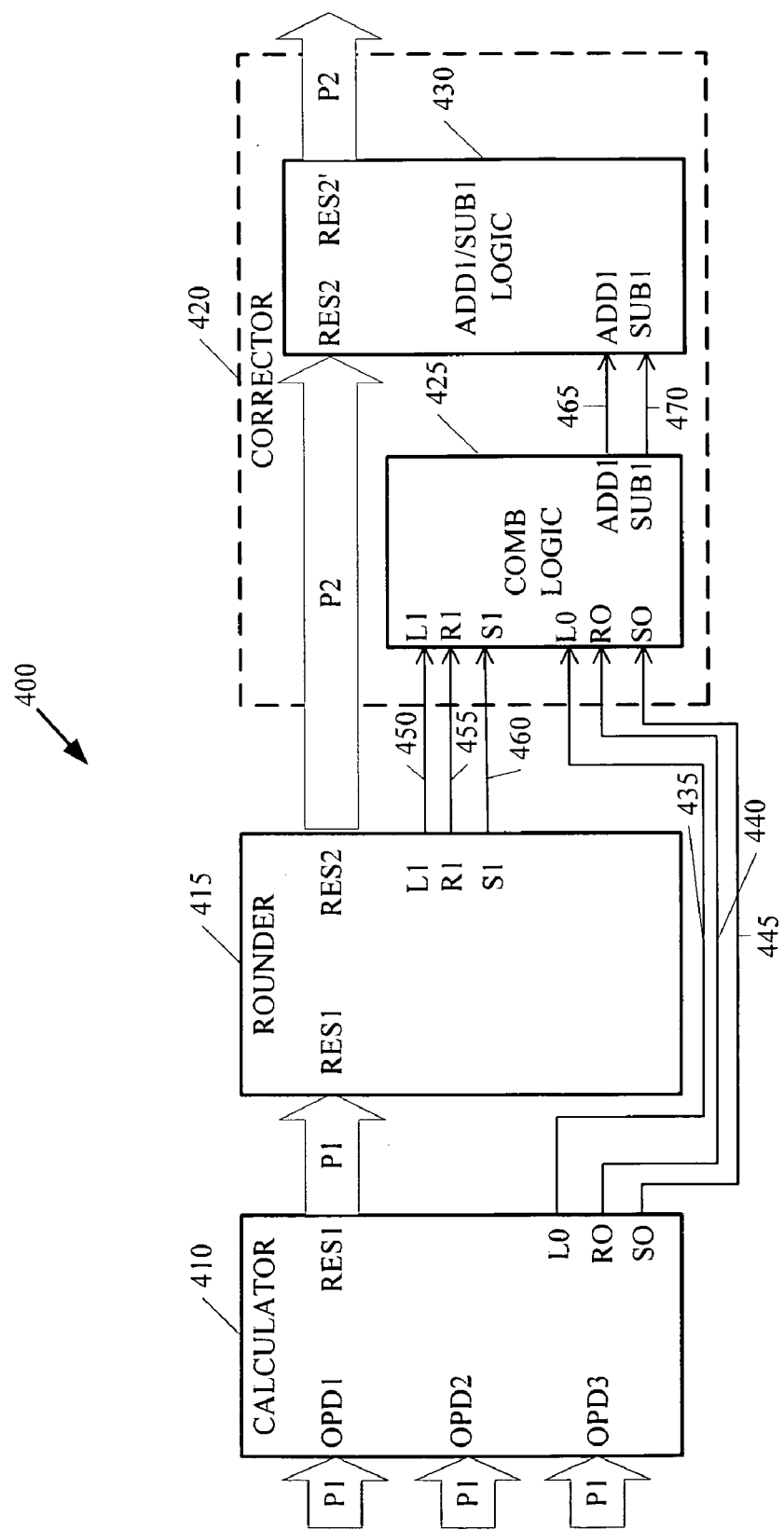
FIG. 4 is an embodiment of hardware to correct double-rounding errors in floating point arithmetic, where the rounding is to nearest-even.

FIG. 4 illustrates the block diagram of a possible hardware implementation 400 to correct double rounding errors. The hardware includes a calculator 410, a rounder 415, and a double-rounding correction logic for rounding to nearest even (corrector) 420. Calculator 410 receives 3 inputs in precision P1, indicated by the three arrows labeled "P1" to the left of the block. Calculator 410 performs the indicated operation, producing intermediate result res0 of precision greater than P1.

Calculator 410 then rounds the result to produce result res1, along with l0 (the least-significant digit), r0 (the rounding digit) and s0 (the sticky bit) for the rounding from res0 to res1. Rounder 420 takes the result res1 from calculator 410 and rounds it to precision P2, producing res2. Rounder 420 also calculates the least-significant digit l1, rounding digit r1 and sticky bit s1 for the rounding from res1 to res2.

Corrector 420 performs logic to correct for double rounding errors. It includes COMBINATION LOGIC 420 and ADD1/SUB1 logic 430. COMBINATION LOGIC 420 tests for a double rounding error. Using inputs l0, r0, and s0 from the first rounding (sent from CALCULATOR 410 through pins 435, 440, and 445 respectively) and l1, r1, and s1 from the second rounding (sent from ROUNDER 415 through pins 450, 455, and 460 respectively), COMBINATION LOGIC 420 generates

```
add1 = is_midpoint_gt_even1 &&
       (is_inexact_lt_midpoint0 ||is_midpoint_gt_even0); and
sub1 = is_midpoint_lt_even1 &&
       (is_inexact_gt_midpoint0 ||is_midpoint_lt_even0)
```

For binary floating-point, for example,

```
add1 = ~l1 & r1 & ~s1 & (~r0 & s0 | ~l0 & r0 & ~s0); and
sub1 = l1 & r1 & ~s1 & (r0 & s0 | l0 & r0 & ~s0).
```

Similar equations can be derived from above for decimal.

The ADD1/SUB1 logic 430 applies a correction to the result res2 of the second rounding based on the correction signals add1 and sub1 but only if a double rounding error has occurred. Otherwise res2'=res2 is already correct. The SUB1 LOGIC 450 also performs the correction of elements 250 and 255 of FIG. 2.

The logic above recognizes the double rounding error of the example at the bottom of page 4. Given l0=4, r0=9, s0=0, l1=1, r1=5, and s1=0. It follows that $$sub1=1 \text{ \&\& } (0||1)=1,$$

and thus the double rounding error upward is detected by COMBINATION LOGIC 420 and corrected by SUB1 LOGIC 450.

FIG. 4 is for illustration and not limitation. In the embodiment of FIG. 4, three operands are used, e.g. for a fused multiply-add. However, most operations where this method can be applied (addition, subtraction, multiplication, division) have two operands, and the square root has only one. The rest of the block diagram is the same in all cases. Overflow and underflow cases (which can occur when rounding from a wider to a narrower format) are not covered explicitly here, but are straightforward to take care of.

Returning to FIG. 2, in many embodiments, a method of correcting for double rounding errors may calculate the above rounding indicators based upon comparing the results of rounding numbers by different methods. Further embodiments may execute the following operations:

(1) Calculate the result res1 of the first operation, rounded to nearest-away to precision P1:
$$res1 = (res0)_{RN, P1} \text{ (res0 is the exact, un-rounded, result of the first operation)}$$
(2) Calculate the result res1_RM of the first operation, rounded to negative infinity to precision P1:
$$res1\_RM = (res0)_{RM, P1}$$
(3) Calculate the result res1_RP of the first operation, rounded to positive infinity to precision P1:
$$res1\_RP = (res0)_{RP, P1}$$
4) The condition (is_inexact_lt_midpoint0 || is_midpoint_gt_even0) is equivalent to ((res1 == res1_RM) && (res1_RM != res1_RP)) and the condition (is_inexact_gt_midpoint0 || is_midpoint_lt_even0) is equivalent to (res1 != res1_RM). These equivalences can be derived from the following table, which enumerates all the possible cases of results rounded to nearest (RN), to negative infinity (RM), and to positive infinity (RP) when the exact result either coincides with a floating-point number F, or is somewhere between two consecutive floating-point numbers L and H:

|  | RN | RM | RP |
| --- | --- | --- | --- |
| exact | F | F | F |
| is_inexact_lt_midpoint | L | L | H |
| is_inexact_gt_midpoint | H | L | H |
| is_midpoint_lt_even | H | L | H |
| is_midpoint_gt_even | L | L | H |

(now only is_midpoint_lt_even1 and is_midpoint_gt_even1 are still needed in order to calculate add1/sub1)

5) calculate 2 * res0 (an exact operation with precision P1)
6) Calculate $(2*res0)_{RM, P2}$ and $(2*res0)_{RP, P2}$
7) if $((2*res0)_{RM, P2} == (2*res0)_{RP, P2})$ {
    // this works for both binary and decimal floating-point.
    determine t, the second least significant bit in the significand of the result
    if (t==1) {
    is_midpoint_lt_even1 = 1; is_midpoint_gt_even1 = 0
    } else ( // if (t==0)
    is_midpoint_lt_even1 = 0; is_midpoint_gt_even1 = 1
    }

The methods of FIG. 2 may enable compliance with the requirements of the IEEE draft of standard 754 with relatively little effort. The hardware embodiment of FIG. 4 requires only a minor addition to the hardware used to perform floating point arithmetic. A possible software implementation of the method above (that for binary floating-point uses existing operations implemented in hardware) can be based on calculating the rounding indicators listed above using different rounding modes (to nearest and directed), and also using existing hardware for very good performance.

In contrast, other ways of complying with the new IEEE 754 operations may prove very burdensome. Double rounding errors are currently ignored in most cases, as they are viewed as ordinary and inevitable rounding errors for floating-point operations (at the present time this is the case for binary floating-point operations using the rounding to nearest-even mode; decimal floating-point operations and the rounding to nearest-away mode are new additions in the revised IEEE Standard 754R).

Building new hardware to directly perform the new IEEE 754 operations may prove very burdensome. If only homogeneous operations (with operands and results in the same format) and conversion operations between various floating-point formats are implemented, then mixed-format operations could not be performed without the risk of double rounding errors. For example, this would be the case for decimal floating-point operations of type 'decimal128+decimal128=decimal64'. The straightforward method would be to implement a dedicated IEEE-correct operation for this either in hardware, or in software. A dedicated hardware implementation would be difficult to justify because 'decimal128+decimal128=decimal64' operations will most likely be a lot less frequent than 'decimal128+decimal128=decimal128" or 'decimal64+decimal64=decimal64' (assuming that these already have hardware implementations). In addition, mixed-format operation types would be quite numerous when several floating-point formats are supported. The same observation applies if the homogeneous operations are implemented in software.

Moreover, the revised standard IEEE 754R mandates that all possible combinations of supported formats for operands and results have to be implemented in order to be compliant (i.e. the results have to be correctly rounded). For decimal floating-point, the rounding to nearest-even mode has to be supported (along with four other rounding modes). For example, combining just values in decimal64 and decimal128 format for decimal floating-point addition, for compliance we will have to implement operations for:

1) decimal64+decimal64=decimal64 (already exists in current IEEE 754R software implementation)
2) decimal64+decimal128=decimal64 (double rounding errors are possible; can use the method presented here)
3) decimal128+decimal64=decimal64 (double rounding errors are possible; can use the method presented here)
4) decimal128+decimal128=decimal64 (double rounding errors are possible; can use the method presented here)
5) decimal64+decimal64=decimal128 (promote operands to decimal 128 and use case 8); no double rounding errors)
6) decimal64+decimal128=decimal128 (promote operands to decimal 128 and use case 8); no double rounding errors)
7) decimal128+decimal64=decimal128 (promote operands to decimal 128 and use case 8); no double rounding errors)
8) decimal128+decimal128=decimal128 (already exists in current IEEE 754R software implementation)

Implementing all of these cases separately may be very burdensome.

Figure 3:
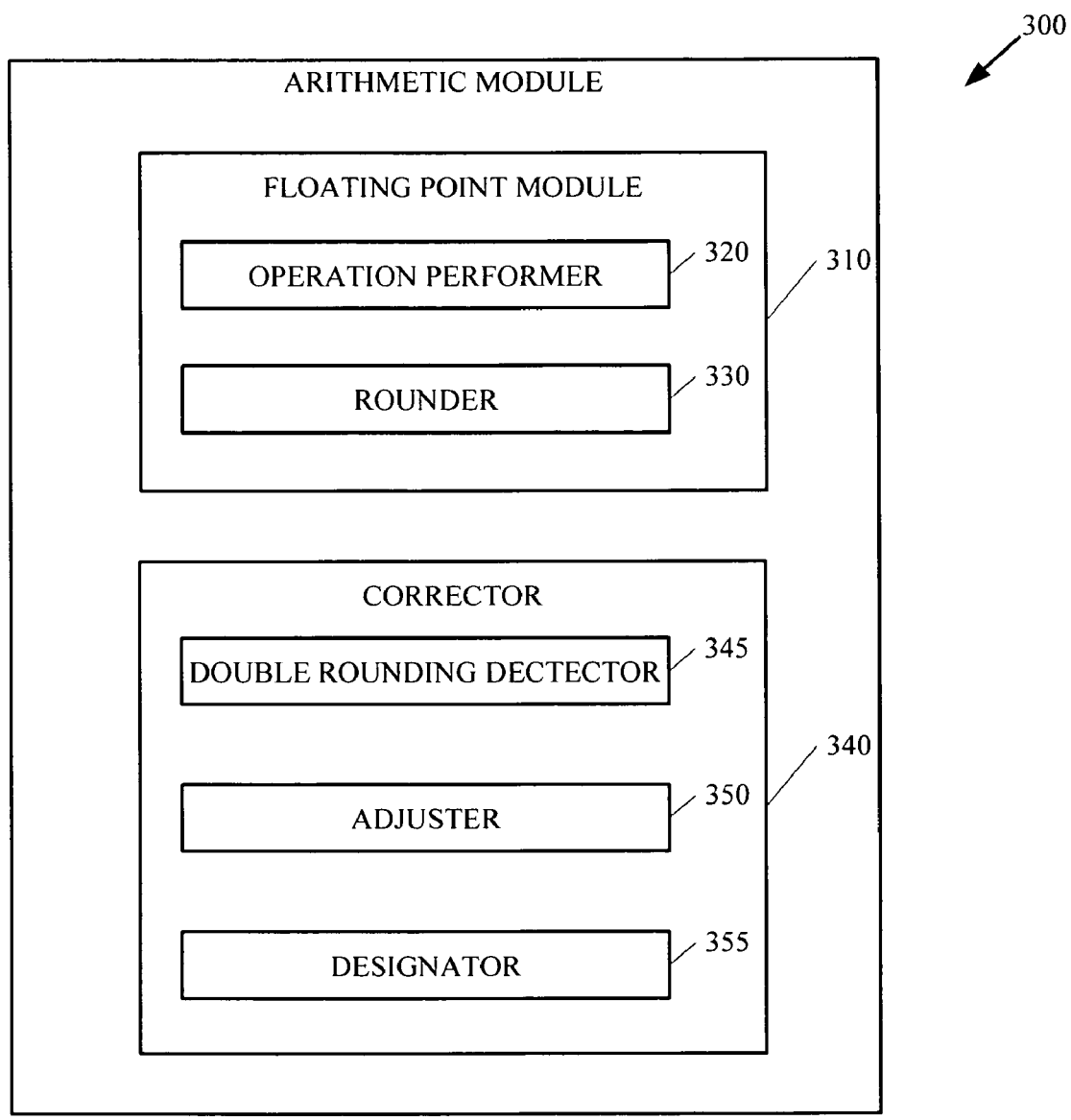
FIG. 3 is a diagram of an embodiment of an apparatus to correct double-rounding errors in floating point arithmetic, where the rounding is to nearest-even.

Turning to FIG. 3, depicted is an arithmetic module 300 to correct double rounding errors when rounding to nearest even. Arithmetic module 300 includes floating point module 310 and corrector 340. Floating point module 310 may perform arithmetic operations and round the results. Corrector 340 may correct the results for double rounding errors.

Floating point module 310 includes operation performer 320 and rounder 330. Operation performer may perform floating point operations. The operations may require rounding, because the intermediate results may produce more digits than permitted by the specified precision. Rounder 330 performs rounding, either to the intermediate results produced by operation performer 320 or when an explicit request for rounding is made. For example, a command may convert a floating point number to a lesser precision. The operations of floating point module 310 may produce errors from double rounding. For example, an arithmetic operation which involves rounding may be followed by a conversion to lower precision.

Corrector 340 corrects double rounding errors. It includes double rounding detector 345, adjuster 350, and designator 355. Double rounding detector 345 detects double rounding errors. Double rounding detector 345 may use the indicators described above to test for the conditions add1 and sub1. Adjuster 350 corrects double-rounding errors when they are detected by detector 345. Adjuster 350 may correct the errors by subtracting one from the significand of the result if condition sub1 is true, and may add one to the significand if condition add1 is true. If the significand is below the specified number of digits indicated by the precision, adjuster 350 may change the result as described in connection with elements 255 and 260 of flowchart 200 in FIG. 2. Designator 355 may change the values of the rounding indicators in case a double rounding occurred, but no double rounding error. Designator 355 may follow the method described in connection with steps 265, 270, 275, and 280 of flowchart 200 of FIG. 2

FIG. 3 is for illustration and not limitation. In hardware embodiments, a floating point module and a corrector may be combined into a single hardware module. In software embodiments of a corrector, the corrector and the floating point module may not be components of the same module.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc., including wireless access mechanisms. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

It will be apparent to those skilled in the art having the benefit of this disclosure that the present invention contemplates methods and arrangements for correcting for double rounding errors when rounding floating point numbers to nearest even. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of floating point arithmetic on a computing device, the method comprising:
    performing, in an arithmetic circuit comprising rounding logic, a floating point operation on one or more floating point numbers of precision P1 in base b, the performing comprising:
        performing the floating point operation to obtain a positive intermediate result res0 of precision greater than P1; and
        rounding positive result res0 to precision P1 to the nearest even, thereby producing positive result res1 of the floating point operation;
    rounding the result res1 to precision P2 to the nearest even, where precision P2 is narrower than precision P1, thereby producing result res2, wherein a significand of res2, viewed as an integer, is an even number; and
    correcting res2 for double rounding errors, wherein the correcting is performed by correcting logic, the correcting comprising:
        determining that res1 is midway between two consecutive floating point numbers of precision P2, the larger being res2;
        determining that rounding res0 to produce res1 involved rounding up;
        decrementing the significand of res2 to obtain res2';
        determining that the significand of res2' is equal to $b^{(P2-1)}-1$;
        setting the significand of the corrected result res2' equal to $b^{P2}-1$; and
        decrementing the unbiased exponent of res2', wherein res2' is the corrected result.

2. The method of claim 1, further comprising:
    performing a second floating point operation on one or more floating point numbers of precision P1 in base b, thereby producing positive result $res_{1,2}$;
    rounding the result $res_{1,2}$ to precision P2 to the nearest even, where P2 is narrower than P1, thereby producing result $res_{2,2}$ wherein a significand of $res_{2,2}$, viewed as an integer, is even;
    determining that $res_{1,2}$ is midway between two consecutive floating point numbers of precision P2, the larger being $res_{2,2}$;
    determining that performing the floating point operation to precision P1 to produce result $res_{1,2}$ included rounding down to the nearest even;
    setting a rounding indicator for $res_{2,2}$ to indicate that $res_{2,2}$ is past midway between two consecutive floating point numbers of precision P2,
    performing a third floating point operation on one or more floating point numbers of precision P1 in base b, thereby producing positive result $res_{1,3}$,
    rounding the result $res_{1,3}$ to precision P2 to the nearest even, where P2 is narrower than P1, thereby producing result $res_{2,3}$, wherein the rounding is exact;
    determining that performing the floating point operation to precision P1 to produce result $res_{1,3}$ included rounding to the nearest away; and
    setting a rounding indicator for $res_{2,3}$ to indicate that generating $res_{2,3}$ included rounding.

3. The method of claim 1, wherein:
    the correcting comprises:
        calculating a least significant digit l0 for res0 and a least significant digit l1 for res1;

calculating a rounding digit r0 for res0 and a rounding digit r1 for res1, wherein the rounding digit for a floating point number is the digit to the right of the least significant digit that fills in the significand of the floating point number; and calculating a sticky bit s0 for res0 and a sticky bit s1 for res1, wherein the sticky bit for a floating point number is the logical OR of all of the digits to the right of the rounding digit of the significand of the floating point number;

the determining that res1 is midway between two consecutive floating point numbers of precision P2, the larger being res2, comprises determining that r1=b/2, that l1 is odd, and that s1 is false; and the determining that rounding res0 to produce res1 involved rounding up comprises determining that either r0>b/2, or that (r0=b/2 and either s0=1 or l0 is odd).

4. The method of claim 3, wherein calculating l0, calculating l1, calculating r0, calculating r1, calculating s0, and calculating s1 comprise calculating l0, l1, r0, r1, s0, and s1 in hardware.

5. The method of claim 1, wherein the correcting comprises:
calculating res0 rounded to negative infinity;
calculating res0 rounded to positive infinity;
calculating 2×res0 rounded to negative infinity; and
calculating 2×res0 rounded to positive infinity.

6. An apparatus for floating point arithmetic on a computing device, the apparatus comprising:
a floating point circuit to:
perform a floating point operation on one or more floating point numbers of precision P1 in base b, the performing comprising:
performing the floating point operation to obtain a positive intermediate result res0 of precision greater than P1; and
rounding positive result res0 to precision P1 to the nearest even, thereby producing positive result res1 of the floating point operation; and
round the result res1 to precision P2 to the nearest even, where precision P2 is narrower than precision P1, thereby producing result res2, wherein a significand of res2, viewed as an integer, is an even number; and
a corrector to correct res2 for double rounding errors, the corrector to:
determine that res1 is midway between two consecutive floating point numbers of precision P2, the larger being res2;
determine that rounding res0 to produce res1 involved rounding up;
decrement the significand of res2 to obtain res2';
determine that the significand of res2' is equal to $b^{(P2-1)}-1$;
set the significand of the corrected result res2' equal to $b^{P2}-1$; and
decrement the unbiased exponent of res2', wherein res2' is the corrected result.

7. The apparatus of claim 6, further comprising a designator to:
perform a second floating point operation on one or more floating point numbers of precision P1 in base b, thereby producing positive result $res_{1,2}$;
round the result $res_{1,2}$ to precision P2 to the nearest even, where P2 is narrower than P1, thereby producing result $res_{2,2}$, wherein a significand of $res_{2,2}$, viewed as an integer, is even;

determine that $res_{1,2}$ is midway between two consecutive floating point numbers of precision P2, the larger being $res_{2,2}$;
determine that performing the floating point operation to precision P1 to produce result $res_{1,2}$ included rounding down to the nearest even;
set a rounding indicator for $res_{2,2}$ to indicate that $res_{2,2}$ is past midway between two consecutive floating point numbers of precision P2,
perform a third floating point operation on one or more floating point numbers of precision P1 in base b, thereby producing positive result $res_{1,3}$,
round the result $res_{1,3}$ to precision P2 to the nearest even, where P2 is narrower than P1, thereby producing result $res_{2,3}$, wherein the rounding is exact;
determine that performing the floating point operation to precision P1 to produce result $res_{1,3}$ included rounding to the nearest away; and
set a rounding indicator for $res_{2,3}$ to indicate that generating $res_{2,3}$ included rounding.

8. The apparatus of claim 6, wherein the corrector comprises software.

9. The apparatus of claim 6, wherein the corrector is to:
calculate a least significant digit l0 for res0 and a least significant digit l1 for res1; calculate a rounding digit r0 for res0 and a rounding digit r1 for res1, wherein the rounding digit for a floating point number is the digit to the right of the least significant digit that fills in the significant of the floating point number; and
calculate a sticky bit s0 for res0 and a sticky bit s1 for res1, wherein the sticky bit for a floating point number is the logical OR of all of the digits to the right of the rounding digit of the floating point number.

10. The apparatus of claim 9, wherein the corrector comprises hardware.

11. A non-transitory machine-accessible medium, the medium having one or more associated instructions to perform floating point arithmetic, wherein the one or more instructions, when executed, cause a machine to:
perform a floating point operation on one or more floating point numbers of precision P1 in base b, the performing comprising:
performing the floating point operation to obtain a positive intermediate result res0 of precision greater than P1; and
rounding positive result res0 to precision P1 to the nearest even, thereby producing positive result res1 of the floating point operation;
round the result res1 to precision P2 to the nearest even, where precision P2 is narrower than precision P1, thereby producing result res2, wherein a significand of res2, viewed as an integer, is an even number; and
correct res2 for double rounding errors, the correcting comprising:
determining that res1 is midway between two consecutive floating point numbers of precision P2, the larger being res2;
determining that rounding res0 to produce res1 involved rounding up;
decrementing the significand of res2 to obtain res2':,
determining that the significand of res2' is equal to $b^{(P2-1)}-1$;
setting the significand of the corrected result res2' equal to $b^{P2}-1$; and
decrementing the unbiased exponent of res2', wherein res2' is the corrected result.

12. The medium of claim 11, wherein the one or more associated instructions, when executed, further cause the machine to:

perform a second floating point operation on one or more floating point numbers of precision P1 in base b, thereby producing positive result $res_{1,2}$;

round the result $res_{1,2}$ to precision P2 to the nearest even, where P2 is narrower than P1, thereby producing result $res_{2,2}$, wherein a significand of $res_{2,2}$, viewed as an integer, is even;

determine that $res_{1,2}$ is midway between two consecutive floating point numbers of precision P2, the larger being $res_{2,2}$;

determine that performing the floating point operation to precision P1 to produce result $res_{1,2}$ included rounding down to the nearest even;

set a rounding indicator for $res_{2,2}$ to indicate that $res_{2,2}$ is past midway between two consecutive floating point numbers of precision P2, perform a third floating point operation on one or more floating point numbers of precision P1 in base b, thereby producing positive result $res_{1,3}$, round the result $res_{1,3}$ to precision P2 to the nearest even, where P2 is narrower than P1, thereby producing result $res_{2,3}$, wherein the rounding is exact;

determine that performing the floating point operation to precision P1 to produce result $res_{1,3}$ included rounding to the nearest away; and set a rounding indicator for $res_{2,3}$ to indicate that generating $res_{2,3}$ included rounding.

13. The medium of claim 11, wherein:

the one or more instructions which cause the machine to correct comprise one or more instructions which cause the machine to:

calculate a least significant digit l0 for res0 and a least significant digit l1 for res1;

calculate a rounding digit r0 for res0 and a rounding digit r1 for res1, wherein the rounding digit for a floating point number is the digit to the right of the least significant digit that fills in the significand of the floating point number; and calculate a sticky bit s0 for res0 and a sticky bit s1 for res1, wherein the sticky bit for a floating point number is the logical OR of all of the digits to the right of the rounding digit of the significand of the floating point number;

the one or more instructions which cause the machine to determine that res1 is midway between two consecutive floating point numbers of precision P2, the larger being res2, comprise one or more instructions which cause the machine to determine that $r1=b/2$, that l1 is odd, and that s1 is false; and the one or more instructions which cause the machine to determine that rounding res0 to produce res1 involved rounding up comprise one or more instructions which cause the machine to determine that either $r0>b/2$, or that ($r0=b/2$ and either $s0=1$ or l0 is odd).

14. The medium of claim 13, wherein the one or more instructions which cause the machine to calculate l0, calculate l1, calculate r0, calculate r1, calculate s0, and calculate s1 comprise one or more instructions which cause the machine to calculate l0, l1, r0, r1, s0, and s1 in hardware.

15. The medium of claim 11, wherein the wherein the one or more instructions which cause the machine to correct comprise one or more instructions which cause the machine to:

calculate res0 rounded to negative infinity;

calculate res0 rounded to positive infinity;

calculate 2×res0 rounded to negative infinity; and calculate 2×res0 rounded to positive infinity.

16. The medium of claim 15, wherein the one or more instructions which cause the machine to calculate res0 rounded to negative infinity and to positive infinity; and calculate 2×res0 rounded to negative infinity and rounded to positive infinity comprise one or more instructions which cause the machine to calculate in software.

17. The medium of claim 11, wherein the one or more associated instructions, when executed, further cause the machine to:

perform another floating point operation on one or more floating point numbers of precision P1 in base b, the performing comprising:

performing the floating point operation to obtain a positive intermediate result res0 of precision greater than P1; and rounding positive result res0 to precision P1 to the nearest even, thereby producing positive result res1 of the floating point operation;

round the result res1 to precision P2 to the nearest even, where precision P2 is narrower than precision P1, thereby producing result res2, wherein a significand of res2, viewed as an integer, is an even number; and correct res2 for double rounding errors, the correcting comprising:

determining that res1 is midway between two consecutive floating point numbers of precision P2, the smaller being res2;

determining that rounding res0 to produce res1 involved rounding down; and incrementing the significand of res2.

\* \* \* \* \*

UNITED STATES PATENT AND TRADEMARK OFFICE
CERTIFICATE OF CORRECTION

Page 1 of 1

PATENT NO.        : 8,069,199 B2
APPLICATION NO.   : 12/006145
DATED             : November 29, 2011
INVENTOR(S)       : Marius Cornea-Hasegan It is certified that error appears in the above-identified patent and that said Letters Patent is hereby corrected as shown below:

In column 16, line 22, in claim 1, after "performed by" insert -- a --.

In column 17, line 56, in claim 6, delete "$b'^{P2}-1;$" and insert -- $b^{P2}-1;$ --, therefor.

In column 18, line 61, in claim 11, delete "res2':," and insert -- res2'; --, therefor.

In column 18, line 63, in claim 11, delete "$b(^{P2-1})-1;$" and insert -- $b^{(P2-1)}-1;$ --, therefor.

In column 20, line 14, in claim 15, after "wherein the" delete "wherein the".

Signed and Sealed this
Third Day of April, 2012

David J. Kappos
*Director of the United States Patent and Trademark Office*